(12) United States Patent
Lou

(10) Patent No.: US 8,254,100 B2
(45) Date of Patent: Aug. 28, 2012

(54) UNITARY COMPUTING DEVICE HAVING ORIENTATION ADJUSTING MECHANISM

(75) Inventor: Yi-Ching Lou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 239 days.

(21) Appl. No.: 12/768,703

(22) Filed: Apr. 27, 2010

(65) Prior Publication Data

US 2011/0128691 A1 Jun. 2, 2011

(30) Foreign Application Priority Data

Nov. 30, 2009 (CN) .......................... 2009 1 0310680

(51) Int. Cl.
*H05K 6/00* (2006.01)
*H05K 7/00* (2006.01)
*F16M 11/00* (2006.01)
*E04G 3/00* (2006.01)

(52) U.S. Cl. ......... 361/679.22; 361/679.21; 361/679.01; 361/679.02; 248/176.1; 248/176.2; 248/184.1; 248/284.1

(58) Field of Classification Search ............. 361/679.21, 361/679.22, 679.01, 679.02; 248/923, 176.1–176.2, 248/183.1, 184.1, 186.1, 284.1, 274.1, 278.1; 345/60, 905; 349/149–152
See application file for complete search history.

(56) References Cited

U.S. PATENT DOCUMENTS

| | | | |
|---|---|---|---|
| 6,288,891 B1 * | 9/2001 | Hasegawa et al. | 361/679.07 |
| 7,180,731 B2 * | 2/2007 | Titzler et al. | 361/679.22 |
| 2010/0051760 A1 * | 3/2010 | Yang et al. | 248/122.1 |

* cited by examiner

Primary Examiner — Jayprakash N Gandhi
Assistant Examiner — Jerry Wu
(74) Attorney, Agent, or Firm — Altis Law Group, Inc.

(57) ABSTRACT

A unitary computing device includes a rotary member and a support for supporting the rotary member and allowing a rotation of the rotary member. The unitary computing device also includes an optical disk drive and at least one orientation adjusting mechanism. The orientation adjusting mechanism includes a first linkage bar rotatably connected to the support, a second linkage bar rotatably connected to the first linkage bar and the optical disk drive, and a third linkage bar rotatably connected to the rotary member and the optical disk drive, which constitutes a linkage bar mechanism to adjust an orientation of the optical disk drive.

7 Claims, 3 Drawing Sheets

UNITARY COMPUTING DEVICE HAVING ORIENTATION ADJUSTING MECHANISM

BACKGROUND

1. Technical Field

The present disclosure relates to unitary computing devices and, more particularly, to a unitary computer having an orientation mechanism to adjust orientation of an optical disk drive.

2. Description of Related Art

Personal computer systems are, by now, well known in the art and have been supplied in a number of different configurations, including desktop systems with CPU housings separate from monitors, notebook systems, and unitary systems. In unitary systems, commonly known as all-in-one desktop computers, information handling elements of the system such as the central processor, associated memory, and drives such as optical disk drives and hard disk drives are housed in a common housing with the display or monitor.

In the unitary system, the orientation of the optical disk drive changes as the orientation of the display is adjusted. Generally, to ensure that the optical disk drive can read data reliably from an optical disk, it is better to keep the optical disk drive horizontal or vertical. It is desirable to provide a unitary computer system that includes an orientation adjusting mechanism to adjust the orientation of the optical disk drive.

BRIEF DESCRIPTION OF THE DRAWINGS

The components in the drawings are not necessarily drawn to scale, the emphasis instead being placed upon clearly illustrating the principles of the unitary computing device. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
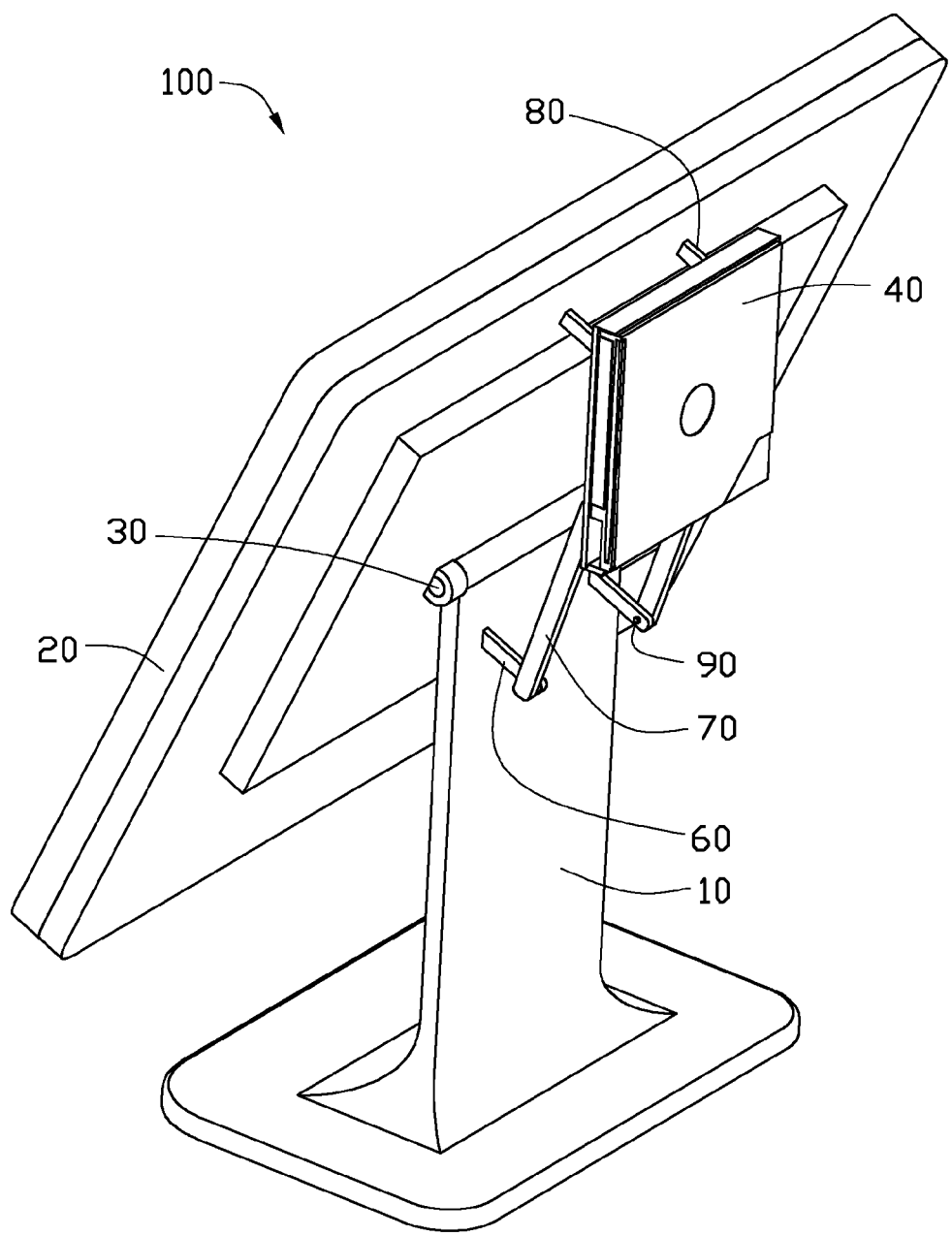
FIG. 1 is an isometric view of a unitary computing device in accordance with an exemplary embodiment.
Figure 2:
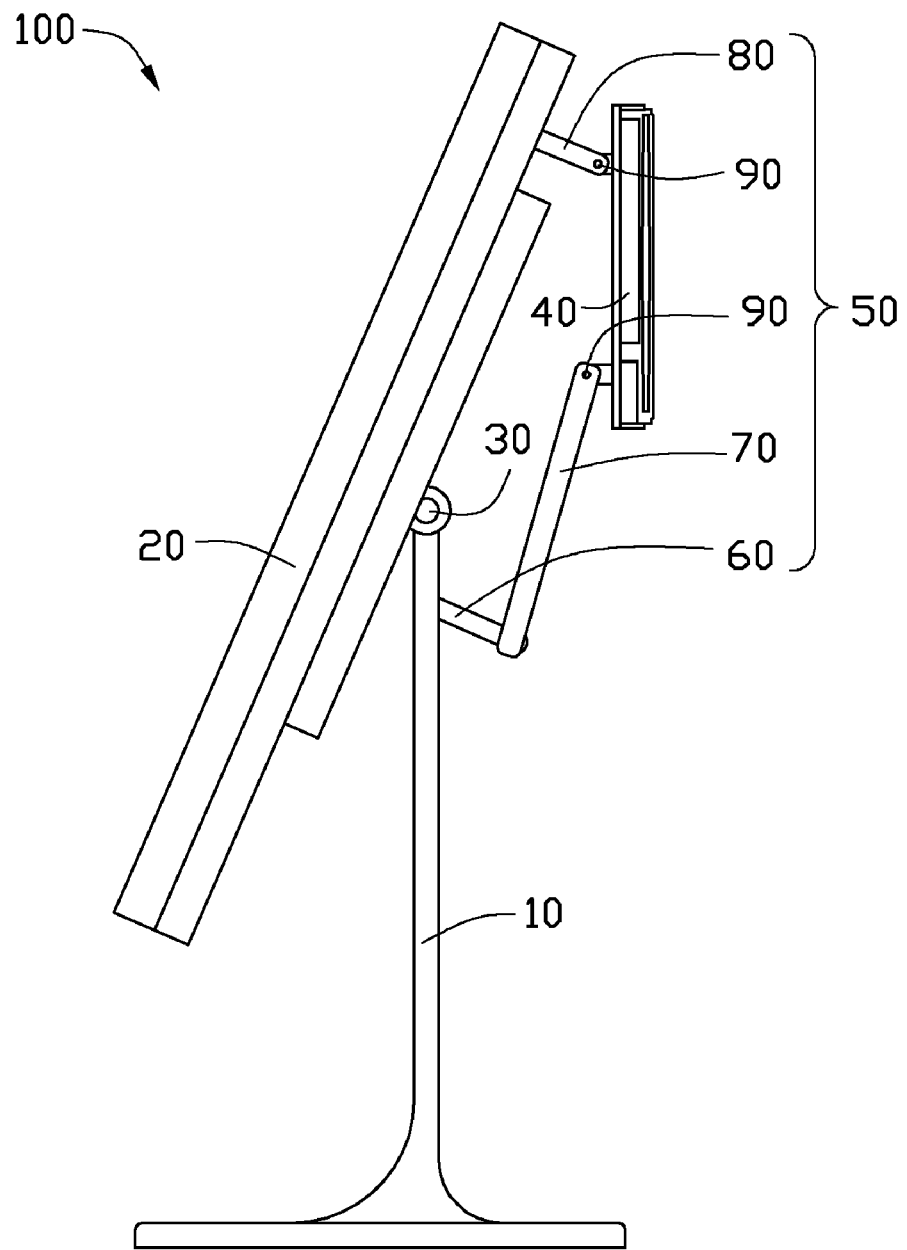
FIGS. 2 and 3 are side views of the unitary computing device of FIG. 1, which show two different orientations of a rotary member and orientation of an optical disk drive stays the same.
Figure 3:
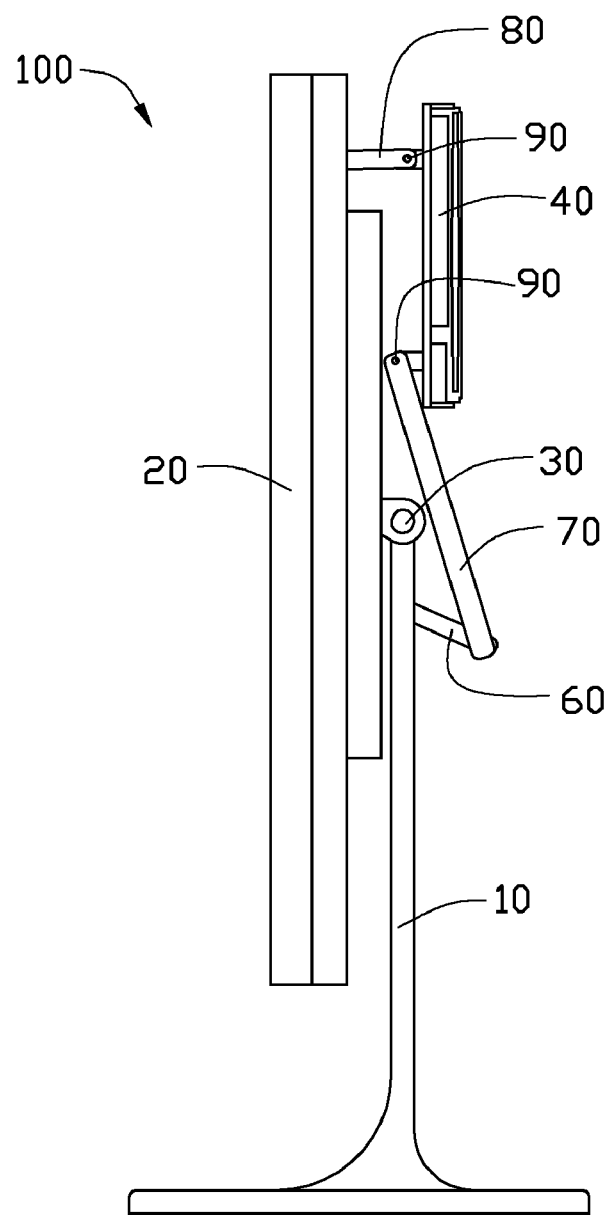

Referring to FIGS. 1-3, a unitary computing device 100 includes a support 10 and a rotary member 20. The rotary member 20 is pivotably connected to the top of the support 10 via a hinge 30. In the embodiment, the rotary member 20 is an LCD display.

The unitary computing device 100 also includes an optical disk drive 40 and two orientation adjusting mechanisms 50. The optical disk drive 40 is movably connected to the support 10 and the display 20 by the orientation adjusting mechanisms 50. In the embodiment, the orientation adjusting mechanisms 50 have the same components arranged in the same manner. The number of the orientation adjusting mechanisms 50 may be changed according to need.

Each orientation adjusting mechanism 50 includes a first linkage bar 60, a second linkage bar 70, and a third linkage bar 80. Two ends of the first linkage bar 60 are rotatably connected to the support 10 and the second linkage bar 70, respectively. Two ends of the second linkage bar 70 are rotatably connected to the first linkage bar 60 and the optical disk drive 40, respectively. Two ends of the third linkage bar 80 are rotatably connected to the optical disk drive 40 and the display 20, respectively. The support 10, the display 20, the optical disk drive 40, and the orientation adjustment mechanisms 50 constitute a linkage bar mechanism.

In the embodiment, a plurality of frictional axles 90 are used to rotatably connect the support 10, the display 20, the optical disk drive 40, and the orientation adjustment mechanisms 50, such that sufficient frictions can be provided therebetween. Due to friction, each of the linkage bars 60, 70, and 80, and the display 20 can be positioned in any desired orientation.

For ease of adjusting the orientation of the optical disk drive 40, the linkage bars 60 and 80 have the same length. The lengths of the linkage bars 60 and 80 are less than that of the linkage bars 70. In the embodiment, the lengths of the linkage bars 60 and 80 are about one third of the linkage bars 70.

FIG. 2 shows that the display 20 is tilted with respect to the support 10, and that the optical disk drive 40 stays substantially vertical. As shown in FIG. 3, after the display 20 is rotated from the tilted orientation in FIG. 2 to a vertical orientation, the optical disk drive 40 can be adjusted to remain vertical.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A unitary computing device comprising:
   a rotary member;
   a support for supporting the rotary member and allowing rotation of the rotary member; and the support comprising a horizontal surface to maintain a steady position of the unitary computing device;
   an optical disk drive; and at least one orientation adjusting mechanism, each comprising:
   a first linkage bar rotatably connected to the support;
   a second linkage bar rotatably connected to the first linkage bar and the optical disk drive; and
   a third linkage bar rotatably connected to the rotary member and the optical disk drive, which constitutes a linkage bar mechanism;
   wherein the linkage bar mechanism keeps the optical disk drive to stay vertical with respect to the horizontal surface when the rotary member is rotated.

2. The unitary computing device according to claim 1, wherein the rotary member is a display device.

3. The unitary computing device according to claim 1, wherein the number of the at least one orientation adjusting mechanism is two.

4. The unitary computing device according to claim 1 further comprising a plurality of frictional axles to connect the first linkage bar, the second linkage bar, the third linkage bar, the optical disk drive, the rotary member, and the support, to provide frictions therebetween by which the optical disk drive is positioned at a desired position.

5. The unitary computing device according to claim 1, wherein the first linkage bar and the third linkage bar have the same length.

6. The unitary computing device according to claim 5, wherein the length of the first linkage bar and the third linkage bar is less than that of the second linkage bar.

7. The unitary computing device according to claim 6, wherein the length of the first linkage bar and the third linkage bar is about one third of the second linkage bar.

* * * * *